United States Patent [19]

Jensen

[11] 4,325,721
[45] Apr. 20, 1982

[54] HIGH PRESSURE MODULAR FOREHEARTH

[75] Inventor: Thomas H. Jensen, Murrysville, Pa.

[73] Assignee: PPG Industries, Inc., Pittsburgh, Pa.

[21] Appl. No.: 193,201

[22] Filed: Oct. 2, 1980

[51] Int. Cl.³ .............................................. C03B 37/025
[52] U.S. Cl. ................................................. 65/1; 65/2; 65/12
[58] Field of Search .................................... 65/1, 2, 12

[56] References Cited

U.S. PATENT DOCUMENTS 2,465,283  3/1949  Schlehr ........................................ 65/1
3,625,025  12/1971  Jensen ..................................... 65/12 X

FOREIGN PATENT DOCUMENTS 1923354  11/1970  Fed. Rep. of Germany ............. 65/1

OTHER PUBLICATIONS

"The Manufacturing Technology of Continuous Glass Fibers", Loewenstein, Elsevier Scientific Publishing Co., NY, 1973, pp. 56-70.

Primary Examiner—Robert L. Lindsay, Jr.
Attorney, Agent, or Firm—John E. Curley

[57] ABSTRACT

A high pressure modular forehearth which receives molten glass under pressure and supplies the molten glass to a plurality of high pressure glass fiber forming bushings is disclosed. Glass is melted in suitable means and is supplied to a modular molten glass column. The high pressure modular forehearth is secured at the lower end of the glass column by a transition module. The modular forehearth is provided with suitable heating elements to maintain the molten glass at a desired temperature. Each module of the forehearth is structured to receive a high pressure glass fiber forming bushing through which the molten glass is forced under pressure to form glass fiber filaments.

13 Claims, 3 Drawing Figures

HIGH PRESSURE MODULAR FOREHEARTH

FIELD OF THE INVENTION

The present invention is directed generally to a high pressure modular forehearth. More particularly, the present invention is directed to a high pressure modular forehearth equipped with glass fiber forming bushings. Most specifically, the present invention is directed to a high pressure modular forehearth which receives molten glass at high temperature and pressure while directing it to the several modules of the forehearth. The glass may be melted in a conventional glass forming furnace and is then supplied to a modular molten glass column, as set forth in detail in my co-pending U.S. Patent Application Ser. No. 193,194 filed Oct. 2, 1980. The glass column delivers the molten glass to the modular forehearth of the present invention which is secured to the lower end of the column by a transition section that is a part of the modular forehearth. The modular forehearth is formed of a plurality of individual modules, each of which is a closed, heated, insulated tubular section that carries a bushing adaptor. Suitable high pressure glass fiber forming bushings are secured to the modules. The number of forehearth modules and hence the number of bushings being used can be easily varied to meet varying fiber production demands.

DESCRIPTION OF THE PRIOR ART

The use of high pressure glass fiber forming bushings to form glass fibers from molten glass is known in the art. These bushings have been supplied molten glass under pressure by various pumps and the like. As set forth in my co-pending patent application Ser. No. 193,194, filed Oct. 2, 1980 these expensive and complex pumps have not been found to be entirely satisfactory for commercial use.

The above-identified patent application is directed to an invention which eliminates problems associated with the known prior art devices by providing a modular molten glass column in which a plurality of glass conduit modules are secured together to deliver molten glass at an elevated pressure to a glass fiber forming bushing carried at the lower end of the column. Since each column carries only a single bushing, each forming position would require a column of its own.

Conventional glass forehearths are well known in the art and are formed as open channels through which molten glass is flowed. Bushings are secured to the bottom of the forehearth in a spaced array to produce glass filaments.

Various systems of this type are described in "The Manufacturing Technology of Continuous Glass Fibres" by K. L. Loewenstein, Elsevier Scientific Publishing Co., N.Y. 1973 at pages 56–70. No commercially satisfactory way has been devised to supply glass to the bushings in the conventional forehearths under pressure due to pump failures and maintenance thereof. Furthermore, the open channel forehearth has required a substantial amount of energy to maintain the temperature of the glass. Additionally, it has been difficult to shut down one forming position for repairs or because of production requirement changes. The reduction in temperature necessary to solidify the glass at a bushing can have an adverse effect on the temperature of the glass in the open flow channel thus disturbing glass flow to other forming positions.

Once a conventional forehearth has been constructed, it is difficult to add additional forming positions to it without shutting down at least a portion of the forehearth. Thus, the conventional forehearth does not adapt well to production volume fluctuations, is not able to supply molten glass under pressure in a commercially practical manner, and requires the expenditure of a large amount of energy to maintain the glass in a molten condition.

SUMMARY OF THE INVENTION

It is an object of the present invention to provide a high pressure modular forehearth.

Another object of the invention is to provide a high pressure modular forehearth useable with a modular molten glass column.

A further object of the present invention is to provide a high pressure modular forehearth having a plurality of modules carrying fiber forming bushings.

Yet another object of the present invention is to provide a high pressure modular forehearth which requires substantially less energy than a conventional forehearth.

As will be set forth in greater detail in the description of a preferred embodiment as set forth hereinafter, the high pressure modular forehearth, in accordance with the present invention, is comprised of a plurality of bushing carrying modules. Each such module is a cylindrical glass conduit which is provided with heating means and insulation to maintain the molten glass at a desired temperature. Since the modular forehearth is a closed system, the molten glass can be maintained under pressure and is delivered to the forming bushings under pressure. The high pressure modular forehearth includes a central transition module which joins the modular forehearth to the modular molten glass column disclosed in my co-pending application Ser. No. 193,194 filed Oct. 2, 1980. As is discussed more fully in that application, the molten glass is delivered to the bottom of the column at an elevated pressure. Since the modular forehearth of the present invention is secured to the lower end of the column and since the forehearth is a closed system, the molten glass is maintained in the modular forehearth under pressure. Hence the forming bushings receive high pressure molten glass in a manner which requires no pumps or other expensive and complex means to deliver molten glass under pressure.

Since the forehearth is modular and is formed of a plurality of essentially identical units, bushings can be added or taken away much more easily than in a conventional forehearth. If it is desired to increase production, a new module can be added to the forehearth. Conversely, if production is to be reduced, the power to a module can be shut off thereby stopping production in that forming position without disrupting the other bushings.

If it is necessary to shut a forming position down, for example, to do maintenance work on the bushing, the power to the bushing can be turned off while the power to the module is left on. In this way, the bushing can be worked on without stopping flow of the molten glass in the forehearth.

The modular forehearth is a closed element which is heated preferably by resistance wires. The forehearth is well insulated and thus requires substantially less energy than the conventional open forehearth. Furthermore, the areas adjacent the modular forehearth are not subjected to as much heat as is the case with the conventional forehearth. The air around the modular forehearth is less turbulent and the filaments being formed by the bushings are less apt to be adversely affected by air turbulence.

Since a modular forehearth having a plurality of forming bushings can be secured to one modular molten glass column, the capacity of an installation can be increased. The glass melting source can supply molten glass to several glass columns each secured where one bushing had previously been located. Each column can carry its own modular forehearth, thus the capacity of the facility can be increased substantially because each modular forehearth carries a plurality of bushings. What had initially been a single bushing in a conventional forehearth, can now accomodate a glass column and a modular forehearth having several bushings.

BRIEF DESCRIPTION OF THE DRAWINGS

While the novel features of the high pressure modular forehearth in accordance with the present invention are set forth with particularity in the appended claims, a full and complete understanding of the invention may be had by referring to a detailed description of a preferred embodiment as set forth hereinafter and as may be seen in the accompanying drawings in which:

DESCRIPTION OF A PREFERRED EMBODIMENT

Figure 1:
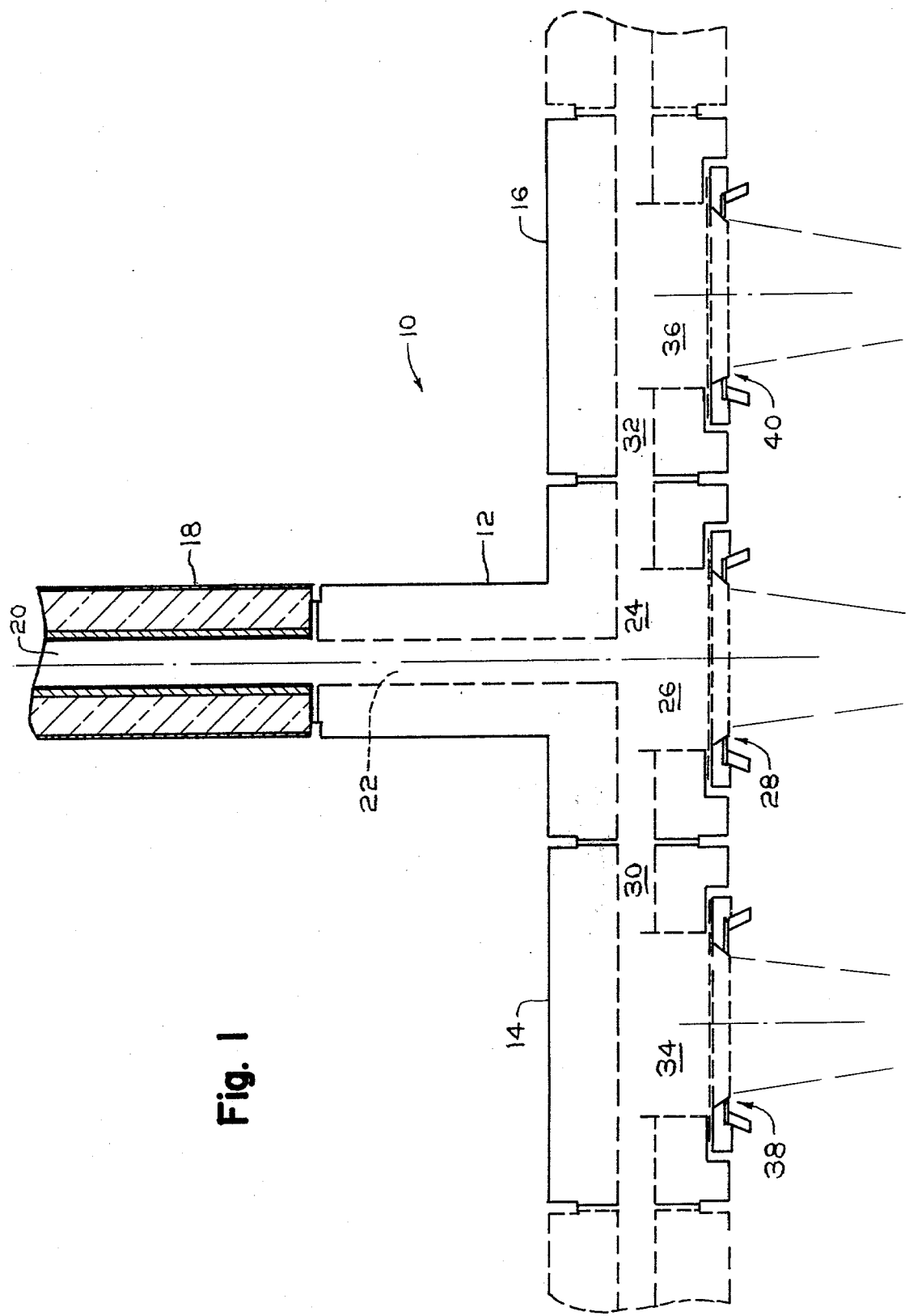
FIG. 1 is a schematic side elevation view, partly in section, of a preferred embodiment of a high pressure modular forehearth in accordance with the present invention.

Turning initially to FIG. 1, there may be seen generally at 10 a preferred embodiment of a high pressure modular forehearth in accordance with the present invention. Modular forehearth 10 is comprised of a transition module 12 and at least first and second forehearth modules 14 and 16. Transition module 12 is generally T-shaped and the leg of the inverted T is secured by suitable means (not shown) to the lower end of a modular molten glass column 18 which is described in detail in my co-pending application Ser. No. 193,194 filed Oct. 2, 1980. Modular molten glass column 18 has a central glass passageway 20 through which molten glass is delivered from a conventional forehearth or other glass melt source. The molten glass is delivered to modular forehearth 19 at a pressure determined by the height of column 18. In the preferred embodiment, the glass pressure is greater than 1 psig and is preferably in the range of 5-30 psig.

Transition module 12 is provided with a downwardly extending central glass conduit 22 which is joined to the passageway 20 in column 18. Conduit 22 carries molten glass to a horizontal glass canal 24 which extends the length of the arms of the transition module 12. Canal 24 supplies molten glass to a high pressure glass fiber forming bushing mounting site 26 to which may be secured a high pressure glass fiber forming bushing 28 of the type set forth in my co-pending applications Ser. No. 193,206 or 193,197 filed Oct. 2, 1980.

Forehearth modules 14 and 16 are provided with horizontal glass canals 30 and 32, respectively, which are in glass flow communication with canal 24 in transition module 12. The forehearth modules 14 and 16 are also provided with bushing mounting sites 34 and 36, respectively, which are the same as mounting site 26 in the transition module 12 and these mounts 34 and 36 support high pressure glass fiber forming bushings 38 and 40 that are the same as bushing 28. While only two forehearth modules 14 and 16 will be hereinafter described as being attached to transition module 12, it will be apparent that additional forehearth modules could be secured to the free ends of forehearth modules 14 and 16, as indicated schematically in FIG. 1.

Figure 2:
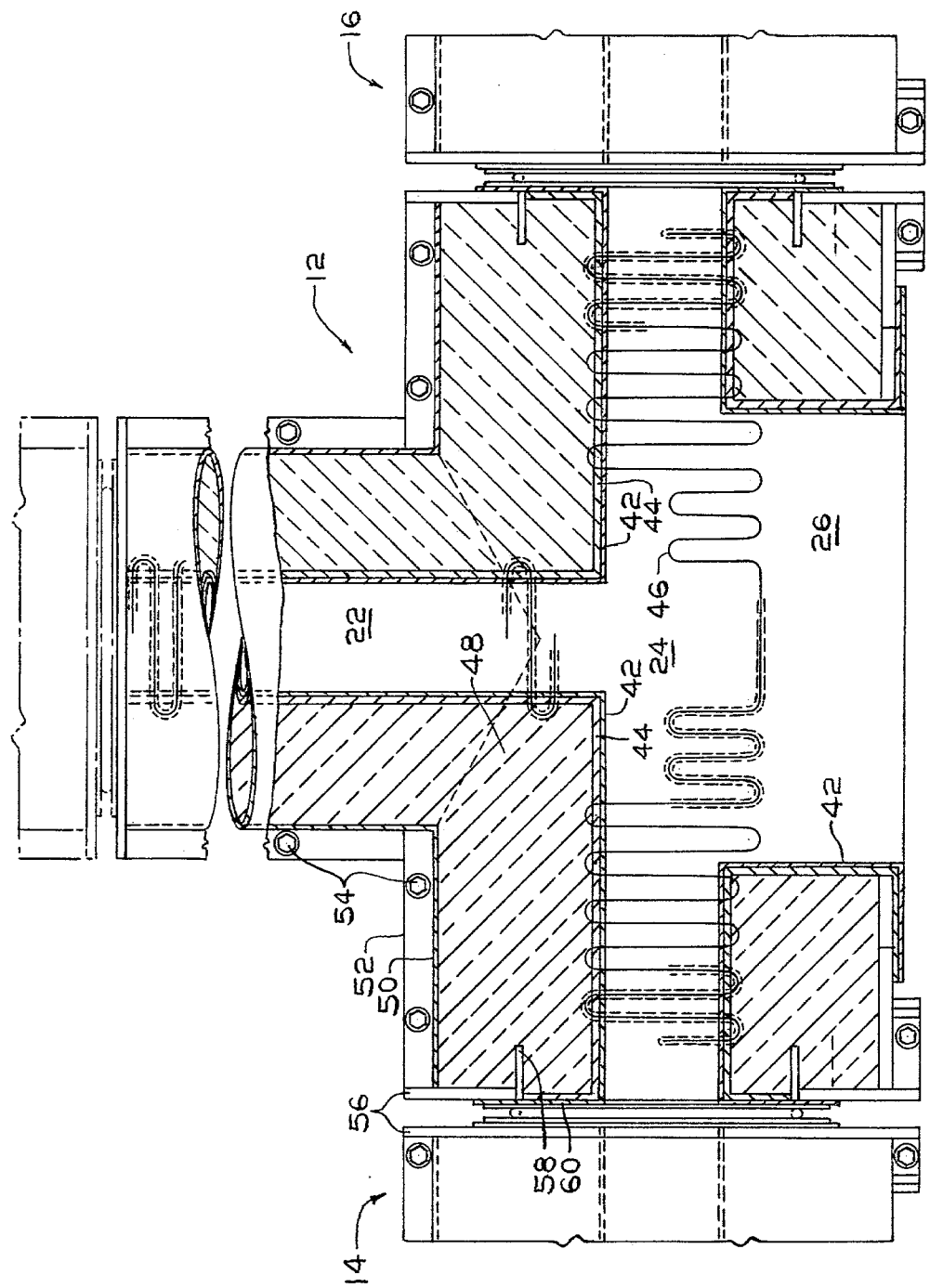
FIG. 2 is a side elevation view, partly in section, of the transition section of the high pressure modular forehearth in accordance with the present invention.
Figure 3:
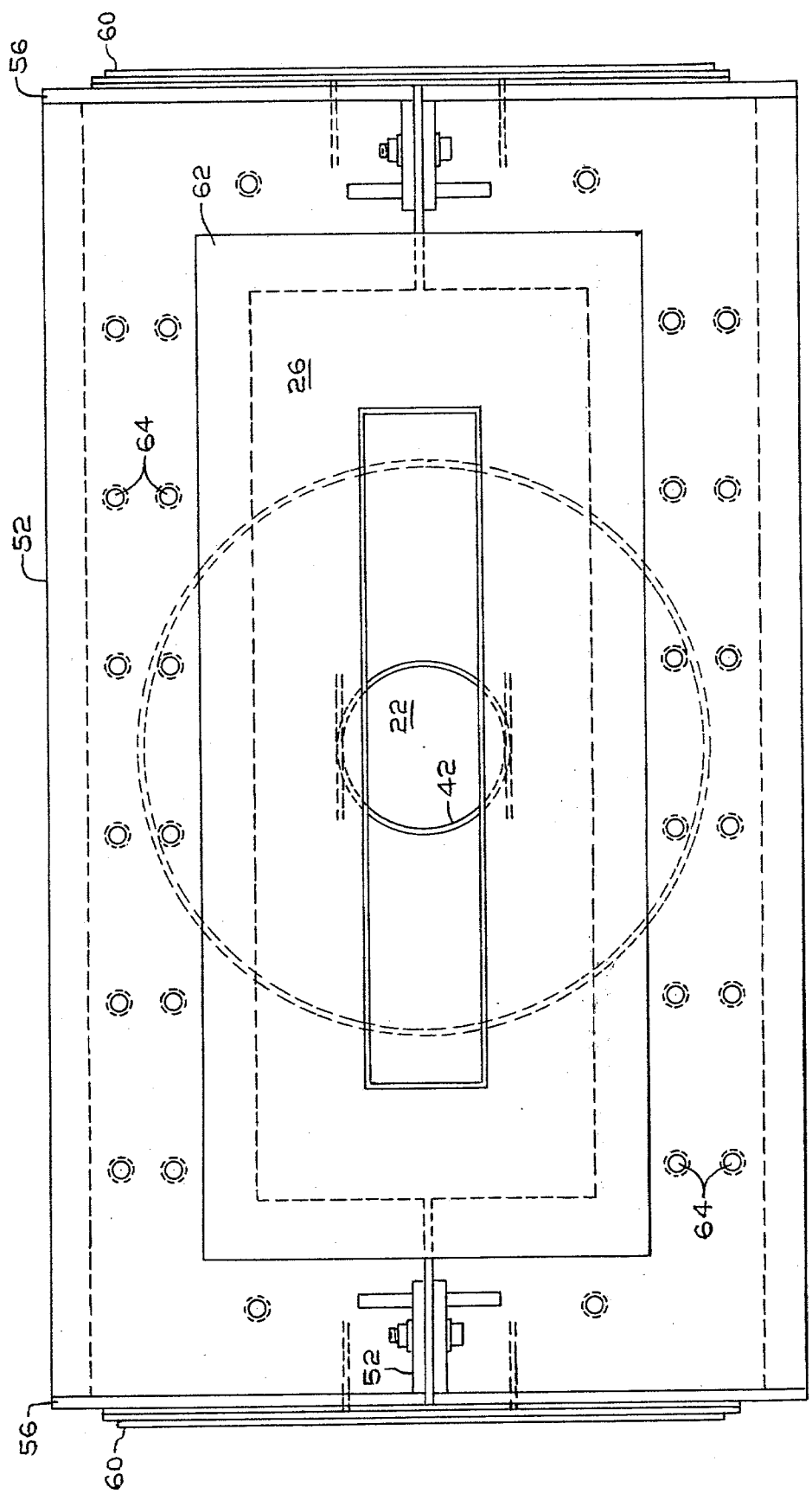
FIG. 3 is a bottom view of the transition section shown in FIG. 2.

Turning now to FIGS. 2 and 3, transition module 12 may be seen in greater detail. While module 12 will now be described in detail, the description will also be applicable to forehearth modules 14 and 16. Downwardly extending glass conduit 22, horizontal glass canal 24 and bushing mounting site 26 are all defined by a layer 42 of noble metal such as platinum or a platinum-rhodium alloy. Layer 42 is surrounded, within the body of transition module 12 by a ceramic liner 44 to which is secured an electric resistance heating element 46 formed as a generally serpentine resistance heating wire. A layer of castable refractory 48 is placed on top of the ceramic liner 44 and heating wires 46 and an outer metal shell 50 covers the refractory 48. At each end of the transition module 12 a cooling ring 69 is provided. Similar rings 70 are provided on the ends of module 14 and 16 as shown in FIG. 1. These rings carry cooling water and assist in freezing off glass in canal 24 when it is desired to shut down a module for bushing replacement.

As was discussed in my co-pending application Ser. No. 193,194 filed Oct. 2, 1980 the ceramic liner 44, heating wires 46, castable refractory 48 and outer metal shell 50 are each formed in two complementary units which are placed about the platinum layer 42 to facilitate fabrication of the module 12. Outer metal shell 50 is provided with spaced fins 52 which have cooperating bolt holes 54 so that the two halves can be secured together. Disk-shaped flanges 56 are placed at the ends of the transition module and have inwardly extending protrusions 58 which are set in the castable refractory 48. Platinum liner 42 extends outwardly beyond the outer ends of conduit 22, canal 24 and bushing mounting site 26 to provide mounting surfaces 60 and 62. Mounting surfaces 60, located at the ends of horizontal glass canal 24, cooperate with similar surfaces on the adjacent forehearth modules 14 and 16 and mounting surface 62 of bushing mounting site 26 receives the bushing 28.

Turning specifically to FIG. 3, it may be seen that bushing mounting site 26 is generally in the shape of a truncated wedge with mounting surface 62 defining a generally rectangular area through which molten glass under pressure will flow to a bushing assembly 28 secured therebelow. Suitable mounting means such as threaded apertures 64 may be provided in metal shell 50 to facilitate securement of bushing 28 to the transition module 12. It will be understood that any satisfactory means can be used to secure bushing 28 in place and that threaded apertures 64 are merely exemplary of one of these means.

In its method of operation, the high pressure modular forehearth 10 in accordance with the present invention is supplied with molten glass at a temperature generally in the range of 2200° F.–2400° F. and at a pressure of at least 1 psig and preferably in the range of 5 to 30 psig. The molten glass is supplied through modular molten glass column 18 from a suitable source such as a conventional forehearth or glass melter. The molten glass flows down through glass conduit 22 in transition module 12 and into the horizontal glass canal 24 then outwardly through canal 24 to the connected canals 30 and 32 in the forehearth modules 14 and 16. The molten glass also flows into bushing mounting sites 26, 34 and 36 where it is forced under pressure through tips (not shown) in the high pressure glass fiber forming bushings 28, 38, and 40, respectively. The filaments so formed can then be gathered in a known manner at a gathering point and can be wound on a mandrel, chopped into fibers, or passed onto a conveyor belt to form a mat product. The glass under pressure contacts only the platinum or similar material layer 42 as it passes through the modular forehearth and out through the various bushings.

The modular forehearth in accordance with the present invention provides many advantages over the prior forehearth system. A single pressurized source of molten glass can supply glass under pressure to a number of forming stations. The modular forehearth in accordance with the present invention also increases the flexibility of a conventional forehearth. Non-pressurized forming can be carried out at several locations on the forehearth and concurrently a modular molten glass column can be used to supply molten glass under pressure to a modular forehearth in accordance with the present invention thereby allowing both non-pressurized and pressurized fiber forming from the same forehearth or glass melt means at two levels of a production facility. Since the modular forehearth, in accordance with the present invention, is completely enclosed and well insulated by the castable refractory, the power needed to maintain the molten glass at a temperature of 2200° F.–2400° F. is substantially less than in conventional open channels forehearths. Finally, the modular forehearth of the present invention provides a great deal of flexibility in the number of bushings used in a forming area. Increased forming needs are accomplished by the addition of more forehearth modules and when the fiber forming need is reduced, outermost ones of the forehearth modules can be shut off without hampering the operation of the remaining modules. Thus, the plant operator has the flexibility to add or subtract forming positions as dictated by production requirements with little attendant cost.

While a preferred embodiment of a modular forehearth in accordance with the present invention has been fully and completely described hereinabove, it will be obvious to one of ordinary skill in the art that a number of changes in, for example, the materials used, the type of connecting means, the structure of the bushing, and the like could be made without departing from the true spirit and scope of the invention and that the invention is accordingly to be limited only by the scope of the appended claims.

I claim:

1. A modular forehearth for use in supplying molten glass from a pressurized source of molten glass to a plurality of pressurized glass fiber forming bushings comprising a transition module having a glass conduit therein connected at one end to a glass canal positioned in said transition module, said canal extending horizontally in at least two directions to provide at least two arms for said canal in said transition module, insulation surrounding said transition module, means to control the temperature of said transition module, means on the bottom of said transition module to connect a glass fiber forming bushing thereto and to establish fluid communication from said canal to said bushing, means to connect the ends of each of said arms of said glass canal to horizontally disposed first and second forehearth modules, each of said forehearth modules being provided with a horizontally disposed glass canal constructed to communicate with the transition module canal when the forehearth modules are connected thereto, each of said forehearth module canals being insulated and being provided with means to control the temperature thereof, means on the bottom of each of said forehearth modules to connect a fiber forming bushing thereto and to establish fluid communication between the forehearth canal and said bushing and means at the other end of said glass conduit to connect said glass conduit to a pressurized source of glass.

2. The modular forehearth of claim 1 wherein said transition module is generally T-shaped.

3. The modular forehearth of claim 2 wherein the source of supply of the molten glass is a modular molten glass column a leg portion of said T-shaped transition module being secured to a discharge portion of said column.

4. The modular forehearth of claims 2 or 3 wherein said forehearth modules are secured to arm portions of said T-shaped transition module.

5. The modular forehearth of claim 1 wherein said transition module and said forehearth modules have platinum lined glass flow paths.

6. The modular forehearth of claim 5 wherein said flow paths are surrounded by ceramic liners.

7. The modular forehearth of claim 6 wherein said ceramic liners carry heating means.

8. The modular forehearth of claim 7 wherein said heating means are resistance wires.

9. The modular forehearth of claim 7 wherein said ceramic liners are surrounded by castable refractory insulation sections.

10. The modular forehearth of claim 9 wherein an outer metal shell is carried by each of said castable refractory insultation sections.

11. A method of forming glass fibers in a modular forehearth comprising:
passing molten glass downwardly under pressures greater than 1 psig to a transition module;
applying sufficient heat to the glass contained in said transition module to maintain the glass molten therein,
passing the glass into a least two horizontal forehearth modules communicating with said transition module;
applying heat to the glass in said horizontal forehearth modules during its passage therethrough;
diverting a portion of the glass contained in said horizontal forehearth modules and said transition module as it moves therethrough to vertically placed glass fiber forming bushings communicating with said modules;
maintaining the temperature of the glass in said bushings at a temperature sufficient to maintain the glass molten;
utilizing the pressure of the glass contained in said modules and bushings to form glass fibers as the glass passes through said bushings; and
collecting the fibers so produced.

12. The method of claim 11 wherein the glass pressure is maintained at 5 to 30 psig.

13. The method of claim 12 wherein the glass is maintained at a temperature of between 2200° F. to 2400° F. in said transition module, said forehearth modules and said bushings.

* * * * *

UNITED STATES PATENT AND TRADEMARK OFFICE
CERTIFICATE OF CORRECTION

PATENT NO. : 4,325,721

DATED : April 20, 1982

INVENTOR(S) : Thomas H. Jensen

It is certified that error appears in the above-identified patent and that said Letters Patent are hereby corrected as shown below:

Column 6, line 37 "insultation" should be --insulation--

Column 6, line 45 "a" should read --at--

Signed and Sealed this

Third Day of August 1982

[SEAL]

Attest:

Attesting Officer

GERALD J. MOSSINGHOFF

Commissioner of Patents and Trademarks